United States Patent

[11] 3,576,081

[72] Inventor William G. McCrary
3220 Brixton Court, Charlotte, N.C. 28205
[21] Appl. No. 885,816
[22] Filed Dec. 17, 1969
[45] Patented Apr. 27, 1971

[54] COMBINATION STRAND-DRYING AND BEARING-LUBRICATION APPARATUS
5 Claims, 5 Drawing Figs.

[52] U.S. Cl. .................................................. 34/153,
184/1, 184/98, 219/470
[51] Int. Cl. ...................................................... F26b 13/00
[50] Field of Search ............................................ 34/152,
153; 263/3; 219/470

[56] References Cited
UNITED STATES PATENTS
2,622,182 12/1952 Forzley et al. ................. 34/153X
2,777,931 1/1957 Bundegaard et al. ......... 34/153X Primary Examiner—Carroll B. Dority, Jr.
Attorney—Robert Brown, Jr.

ABSTRACT: A combination strand-drying and bearing-lubrication unit for a godet thermoplastic strand processing assembly having a driven cantilevered heated roller and a companion cantilevered unheated idler roller. In operation, a strand is continuously fed onto one end of both rollers, after which it is conveyed automatically under tension in an approximately helical path to the takeoff end during which the helical strand portion transfers heat from the heated to the unheated roller in progressively increasing amounts. In order to obtain a highly effective heat distribution throughout the length of the exterior drying surface of the idler roller and throughout its interior bearing surfaces, the idler roller is provided with a reservoir in which a fluid medium such as oil or grease is confined in heat exchange relationship with both the drying and bearing surfaces.

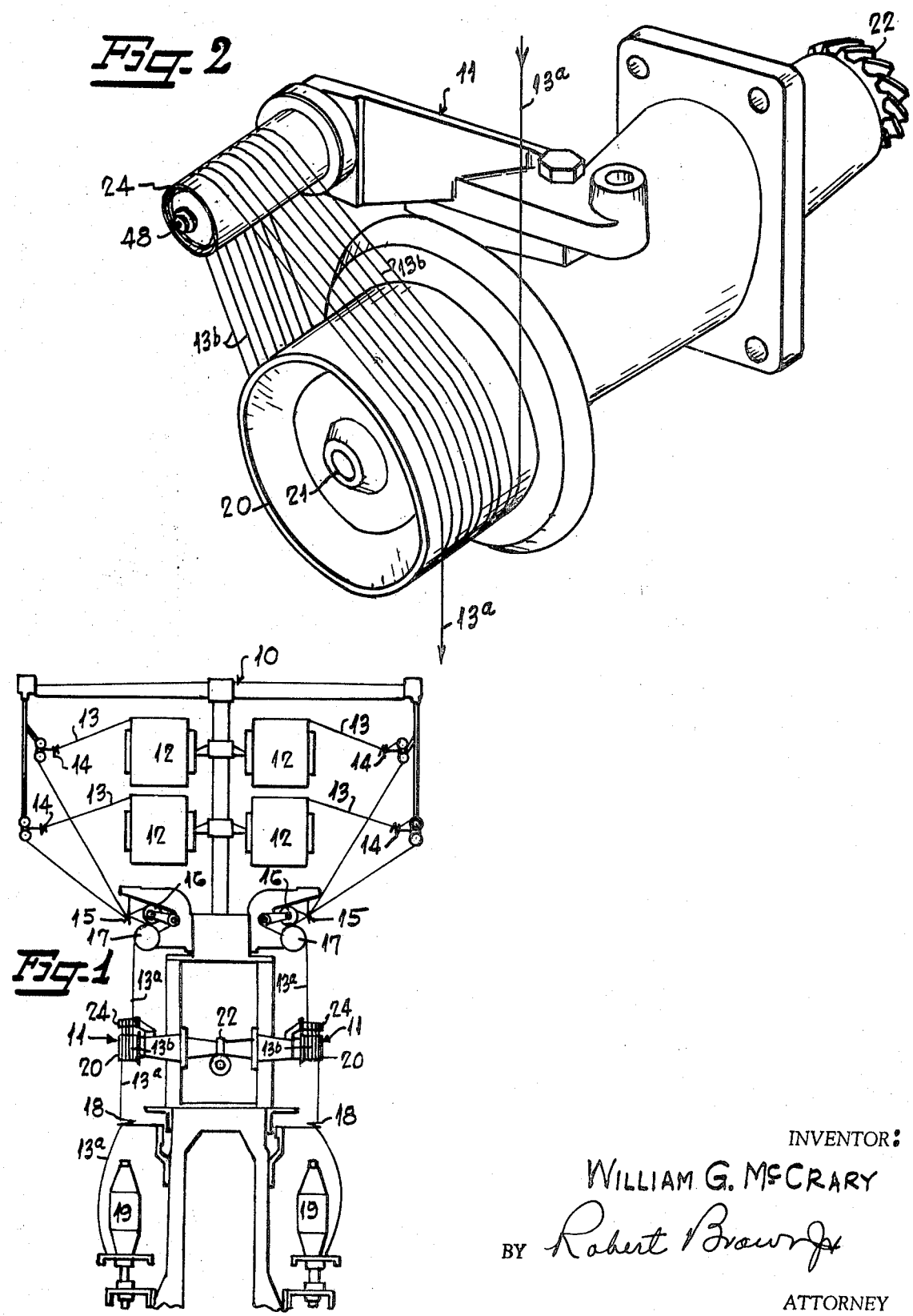

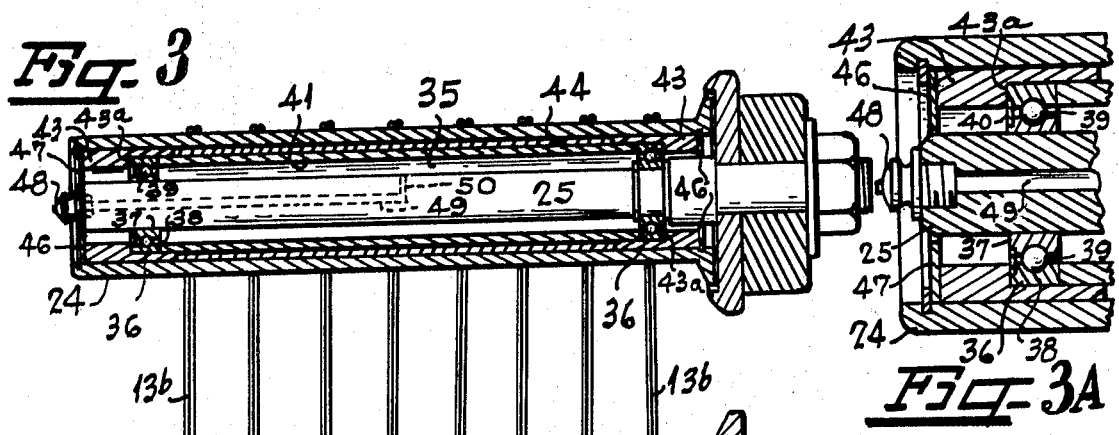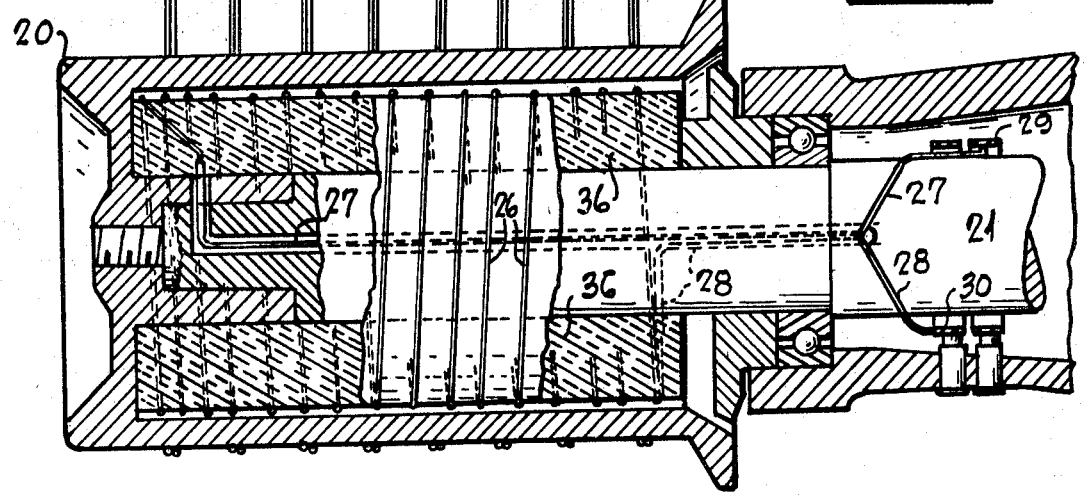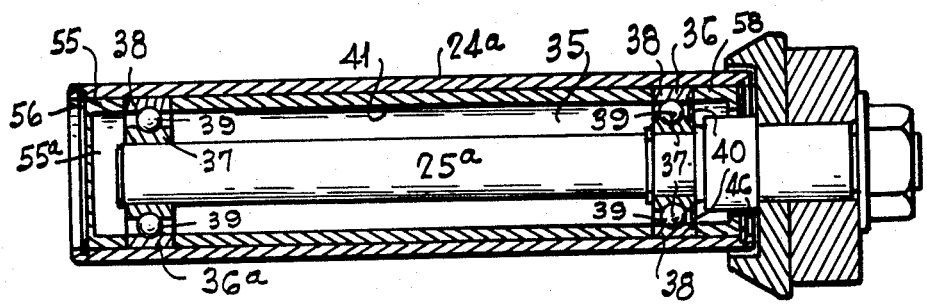

COMBINATION STRAND-DRYING AND BEARING-LUBRICATION APPARATUS

This invention relates to a godet roller stretch assembly and more especially to a combination strand-drying and bearing-lubrication system for performing the dual function of maintaining a substantially uniform heating temperature in thermoplastic filament and fiber strands during stretching, twisting, and drying thereof, concurrently with maintaining the same uniform temperature in the bearing surfaces under lubrication.

In conventional draw-twist processes of thermoplastic fiber and filament strands, the strands are heated and stretched while travelling in a helical path around a pair of cantilevered spaced rollers, one of said rollers being heated and positively driven, and the other being an unheated idler roller. The idler roller is mounted upon a stationary cantilevered shaft by means such as spaced ball bearing assemblies located radially inwardly of the helical strand portions travelling on the outer periphery of the roller. These helical strand portions or turns repeatedly pass back and forth between the heated and unheated rollers while being guided longitudinally thereof toward the takeoff end, causing heat to be transferred through the turns to the unheated roller in progressively increasing amounts which attain a maximum heat at said takeoff end. Such an uneven heat distribution occurs in the idler unheated roller even though the heated roller may be differentially heated along its length with a view of compensating for the uneven heating in the idler roller. As a result, the excessive heat at the takeoff end of the idler roller greatly reduces the effective life of the underlying idler roller ball bearing and further produces processed strand material of an inferior quality. Moreover, such uneven heat distribution has created an acute maintenance problem, usually requiring reconditioning or replacement of the idler or separator roller after only a few days operation.

It is therefore an object of this invention to provide an idler roller of the class described which is equipped with a combination strand-drying and bearing lubrication system capable of obviating the aforementioned problems in prior art rollers. Specifically, this object is attained by providing a reservoir on the interior of the roller for containing a fluid lubricant adapted to be circulated in heat exchange relationship with both the bearing and strand-drying surfaces. The circulation means for the lubricant includes the centrifugal action of the roller which holds the lubricant in a radially outward position against the interior reservoir wall surface where it can absorb the transferred heat from the exterior roller periphery, and also the transversely acting force produced upon the lubricant as it enters and is expelled from between the bearing races by the balls thereby causing the lubricant to flow back and forth longitudinally of the reservoir and of the exterior drying surface of the roller.

Some of the objects of invention having been stated, other objects will appear as the description proceeds when taken in connection with the accompanying drawings, in which:

FIG. 1 is a schematic view crosswise of a draw-twister frame, showing a pair of my improved strand-drying and bearing-lubrication assemblies mounted thereon;

FIG. 2 is an isometric view of one of the assemblies;

FIG. 3 is a longitudinal sectional detail view through the rollers of the assembly and parts of the driving means;

FIG. 3A is an enlarged sectional detail view similar to the upper left-hand portion of FIG. 3, and FIG. 4 is a longitudinal sectional view similar to FIG. 3, but showing a modified form of the invention.

Referring more specifically to the drawings, the numeral 10 denotes a conventional draw-twister frame having my improved combination strand-drying and bearing-lubrication unit 11 mounted thereon. The frame 10 is employed for stretching melt-spun multifilaments of certain synthetic compositions such as polyesters and polypropylene; and it comprises packages 12 of unstretched filaments 13, strand guides 14 and 15, top and bottom delivery rollers 16 and 17, units or assemblies 11, strand guides 18, and bobbins 19.

In a conventional process, the unstretched filaments 13 are drawn downwardly from packages 12, through guide 14, and to guide 15 where it becomes a double strand 13a, which strand 13a passes further downwardly between rollers 16 and 17 and onto assembly 11. The difference in spaced between assembly 11 and the rollers 16 and 17 thereabove stretches the strand 13a several times its original length, after which a slight twist is imparted and the strand is wound upon takeup bobbin 19.

Heating the filament strand 13a during the stretching step is of critical importance. For example, the stretching of polyester filament below 80° C. causes excess breakage, while the stretching of this filament too close to its melting point of about 256° C. adversely effects its quality. Heat is applied to the filament 13a by means of a godet or draw roller 20 of the assembly 11 in a manner described in detail below.

The draw roller 20 is cantilevered and positively driven by means of a shaft 21 and a gear 22 fixed upon the shaft. This roller operates in conjunction with an idler or separator roller 24 rotatably mounted upon cantilevered shaft 25, said rollers 20 and 24 having several helical turns 13b of the strand 13a wound therearound. It will be observed in FIG. 3 that the rollers 20 and 24 are mounted with their respective longitudinal axes positioned at a slight convergent angle so that the helical turns 13b will be guided automatically from the feed-on end to takeoff end of the rollers.

Numerous types of heating means may be employed for the godet roller 20, such as the electrical resistance coil 26 as illustrated in the drawings, or by radiant energy, or by pin heaters. The coil 26 has terminal leads 27 and 28 connected to brush rings 29 and 30, respectively, which in turn are mounted upon shaft 21. Coil 26 is wound around an insulation core 33 fixedly mounted upon the shaft, said coil being in spaced relation to the inside periphery of the draw or godet roller 20 but sufficiently close to heat the exterior roller periphery.

As each helical turn 13b travels from the feed-on end to the takeoff end of the rollers 20 and 24, it transmits heat from the roller 20 to the roller 24 in progressively increasing amounts. For example, if the temperature of a helical turn at the feed-on end of the rollers is 200° F., it may be increased to double that amount when it reaches the takeoff end, thereby producing an excessive accumulation of heat and a correspondingly reduced quality of filament as well as a reduced life of the supporting bearing for the roller.

In order to more effectively equalize the heat distribution over the length of the separator roller 24, an elongated annular lubricant reservoir 35 is provided around stationary shaft 25 and inside the roller. The interior surfaces of the reservoir are positioned so that the lubricant therein is in heat exchange relationship with both the interior bearing surfaces of roller 24 and the exterior roller drying and heating surface.

More specifically, the inside surfaces of the reservoir comprise the tubular spacer member 41 concentrically positioned radially inwardly of the exterior surface or periphery of the roller 24, and a pair of spaced ball bearing assemblies 36 mounted at each end of the spacer member 41 and upon stationary shaft 25 (FIGS. 3 and 3A). Each ball bearing assembly has an inner race 37, an outer race 38, balls 39 between the races, and a seal 40 on the bearing end remote from the reservoir 35.

It will be observed that the inside peripheries of the outer bearing races 38 have the same diameter as the inside diameter of the spacer tube 41, that is, the inner periphery of member 41 is flush with the inner peripheries of the outside races. This flush arrangement prevents the lubricant, when subjected to the centrifugal force of roller rotation, from being trapped radially outwardly beyond the proximate open ends of the bearing assemblies 36, thereby making the entire volume of lubricant within the reservoir available for lubrication and cooling the bearing surfaces.

As stated above, centrifugal force holds the lubricant against the interior of spacer tubular member 41 and in heat exchange with the exterior heating surface of roller 24. This centrifugal action also tends to spread the lubricant longitudinally of reservoir 35 and into the proximate open ends of the spaced ball bearing assemblies. Still further circulation is obtained by the ball bearing assemblies 36 themselves. During rotation of the roller 24 and the spaced outer races 38 fixedly secured thereto, the balls 39 roll in stationary races 37 on cantilevered shaft 25, during which there occurs a rapid series of alternately acting forces for sucking lubricant into and expelling it from between the races of the spaced assemblies 36. This alternating reciprocatory churning motion of the lubricant at each end of reservoir 35 acts longitudinally in the same direction as the lateral component of the centrifugal force when the lubricant is sucked between the races, and in opposition to the lateral component force at the points of expulsion of the lubricant by the balls from between the races. Thus, the lubricant is freely circulated by the bearings longitudinally of the reservoir to maintain a substantially uniform temperature of the lubricant which, in turn, produces a more even distribution of heat on the exterior drying surface and the interior bearing surfaces of the roller 24.

Each of the spaced outer races 38 is wedged or confined between an end of the reservoir tube 41 and a shoulder 43a of an adapter 43. It will be noted in FIG. 3 that the outside diameter of the adapter is greater than that of the reservoir tube 41, said adapters supporting the opposite ends of the roller 24. Obviously, the outside diameter of the adapters 43 must correspond to the size of the supported roller 24, thus providing means for adapting the same size reservoir to outer roller 24 of different diameters. In order to preserve the heat conductivity path between the interior surface of tube 41 and the exterior surface of roller 24, a conductive tubular filler 44 is positioned between the proximate ends of the spaced adapters 43.

The adapter 43 at the inner or feed-on end of roller 24 is confined in position against outer ball race 38 by a retaining ring 46, while the adapter 43 at the opposite takeoff end of the roller is similarly confined by means of washer 47 and another retaining ring 46.

Lubricant under pressure may be introduced into reservoir 35 through fitting 48 on the end of shaft 25, said fitting coinciding with one end of axial bore 49 having a radially extending bore 50 leading from its other end into the reservoir.

In the event the inside diameter of the roller 24 should be the same as the outside diameter of the outer race 38, the adapters 43 are unnecessary as will be noted from the modification shown in FIG. 4. Moreover, a somewhat increased heat exchange efficiency may be obtained without use of the adapter since the wall thickness between the interior reservoir periphery and the exterior drying periphery of roller 24 is correspondingly reduced.

During the rotation of separator roller 24, the lubricant in reservoir 35 is subjected to the heat which is transferred from godet roller 20 to the separator roller by means of the helical strand turns 13b, as previously described, thus reducing the lubricant to a highly fluid state and facilitating the circulation thereof.

FIG. 4 is a sectional view through an idler roller 24a, similar to the previously described roller 24 but embodying certain modifications including the absence of adapters 43. It will be observed that roller 24a is adapted to contain lubricant under substantially atmospheric pressure and, accordingly, appropriate changes are necessary.

The right-hand end of roller 24a is rotatably mounted upon a stationary shaft 25a by means of one of the above-described bearing assemblies 36 and a spaced bearing assembly 36a, the latter bearing assembly having no seals at either of its ends while the bearing assembly 36 has a seal 40 remote from reservoir 35. The rim of a cup or cap 55 fits against the outside end of outer race of assembly 36a, said cup being releasably confined in position by a retaining ring 56.

The absence of seals from the bearing assembly 36a establishes communication between the reservoir 35 and the recess 55a in cap 55 thereby permitting the balls 39 to churn the lubricant axially of the reservoir and recess more effectively at the point where maximum heat accumulation tends to occur. Also, the cup 55 may be easily removed and replaced when replenishing the reservoir with lubricant inasmuch as the removal of retaining ring 56 permits dismantling of the roller when desired.

The bearing assembly 36 at the feed-on end of roller 24a is releasably confined in position by another cap member 58 and a retaining ring 46.

I claim:

1. A combination strand-drying and bearing-lubrication assembly comprising a pair of spaced cantilevered longitudinally extending rollers, means for heating one of said rollers, a stationary shaft for rotatably supporting the other of said rollers, means for automatically guiding a plurality of helical turns of said strand around said spaced rollers from the feed-on end to the takeoff end thereof whereby rotation of the rollers will cause heat to be transferred through the strand turns from the heated to the unheated roller in progressively increasing amounts as the takeoff end is approached, and means disposed within said other roller and in heat exchange relationship with the drying and bearing surfaces thereof for concurrently reducing the heat differential of said surfaces and for lubricating the bearing surfaces.

2. The combination assembly as defined in claim 1 wherein said last-named means comprises a tubular chamber disposed within said other roller for holding a fluid lubricant, and means at the opposite ends of said chamber and operable upon the rotation of the other roller for agitating the lubricant longitudinally of the chamber.

3. The combination assembly as defined in claim 1 wherein said last-named means comprises a tubular chamber concentrically disposed about said stationary shaft, spaced bearings on said shaft and forming the ends of said chamber, means for introducing a supply of lubricant into said chamber, and means including a portion of each of said spaced bearings for reciprocating said lubricant longitudinally of the chamber concurrently with the rotation of roller whereby the lubricant will be circulated in heat exchange relationship with the reservoir surfaces.

4. The combination as defined in claim 1 wherein said last-named means comprises a tubular lubricant chamber concentrically disposed about said stationary shaft, spaced bearings on said shaft and forming the ends of said chamber, each of said bearings including an outer race and an inner race with rollable elements disposed between said races whereby the rollable elements will impart longitudinal reciprocatory motion to the lubricant during rotation of the roller, and wherein the inside peripheries of said spaced outer races are flush with the inside periphery of said chamber.

5. The combination as defined in claim 2 wherein said last-named means comprises spaced bearings on said shaft and forming the ends of said chamber, each of said bearings including an outer race and an inner race with balls separating the races, a second chamber longitudinally remote from said first chamber and communicating with the first chamber through the space between the inner and outer races of one of said bearings.